US007127483B2

United States Patent
Beaumont-Smith et al.

(10) Patent No.: US 7,127,483 B2
(45) Date of Patent: Oct. 24, 2006

(54) METHOD AND SYSTEM OF A MICROPROCESSOR SUBTRACTION-DIVISION FLOATING POINT DIVIDER

(75) Inventors: Andrew J. Beaumont-Smith, Cambridge, MA (US); Sridhar Samudrala, Westboro, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 200 days.

(21) Appl. No.: 10/036,116

(22) Filed: Dec. 26, 2001

(65) Prior Publication Data

US 2003/0135531 A1    Jul. 17, 2003

(51) Int. Cl.
   *G06F 7/44*    (2006.01)
(52) U.S. Cl. ...................... 708/504; 708/655
(58) Field of Classification Search ................ 708/504, 708/655
   See application file for complete search history.

(56) References Cited

U.S. PATENT DOCUMENTS

| | | | | |
|---|---|---|---|---|
| 4,084,254 A | * | 4/1978 | Birney et al. ............... | 708/655 |
| 4,320,464 A | * | 3/1982 | Desmonds ................... | 708/655 |
| 5,237,525 A | * | 8/1993 | Rossbach .................... | 708/655 |
| 5,341,322 A | * | 8/1994 | Fettweis et al. ............ | 708/655 |
| 5,357,455 A | * | 10/1994 | Sharangpani et al. ....... | 708/656 |
| 5,386,376 A | * | 1/1995 | Girard et al. ............... | 708/655 |
| 5,696,712 A | * | 12/1997 | Prabhu et al. .............. | 708/650 |
| 5,784,307 A | * | 7/1998 | Sheaffer ...................... | 708/655 |
| 5,870,323 A | * | 2/1999 | Prabhu et al. .............. | 708/655 |
| 5,954,789 A | | 9/1999 | Yu et al. ..................... | 708/495 |
| 6,549,926 B1 | * | 4/2003 | Kalambur et al. .......... | 708/650 |

OTHER PUBLICATIONS

Luis A. Montalvo et al., *Brief Contributions; New Svoboda-Tung Division*, IEEE Transactions on Computers, vol. 47, No. 9, Sep. 1998, pp. 1014-1020.
Paolo Montuschi et al., *Over-Redundant Digit Sets and the Design of Digit-by-Digit Division Units*, IEEE Transactions on Computers, vol. 43, No. 3, Mar. 1994, pp. 269-277.
Chin Tung, *A Division Algorithm for Signed-Digit Arithmetic*, IEEE Transactions On Computers, Sep. 1968, pp. 887-889.
Hosahalli R. Srinivas et al., *Radix 2 Division with Over-Redundant Quotient Selection*, IEEE Transactions on Computers, vol. 46, No. 1, Jan. 1997, pp. 85-92.
Milos D. Ercegovac et al., *Correspondence; Simple Radix -4 Division with Operands Scaling*, IEEE Transactions on Computers, vol. 39, No. 9, Sep. 1990, pp. 1204-1207.

* cited by examiner

*Primary Examiner*—Tan V. Mai

(57) ABSTRACT

The specification discloses a structure of and a method of operating a subtractive division (SD) cell where a portion of the partial remainder or estimated partial remainder directly indicates the next quotient digit. More particularly, by sufficiently constraining the prescaled range for each possible divisor, only a few bits of the partial remainder (the exact number dependent upon the radix), along with their related carries (if any), directly indicate the value of the next quotient digit. Because fewer bits of the partial remainder are needed to make this determination than needed in related art devices, and further because no look-up table or hard-coded decision tree is required, calculation time within each SD cell is shorter than related art devices. Having a shorter calculation time within each SD cell allows for either completion of a greater number of SD cells within each clock cycle, or completion of the calculation to full precision in less time.

31 Claims, 3 Drawing Sheets

METHOD AND SYSTEM OF A MICROPROCESSOR SUBTRACTION-DIVISION FLOATING POINT DIVIDER

CROSS REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The preferred embodiments of the present invention are directed to microprocessors. More particularly, the preferred embodiments of the present invention are directed to floating point dividers in microprocessors.

2. Background of the Invention

Most modern microprocessors have the ability to perform floating point operations in hardware. Particularly difficult among these floating point operations are division and square root operations. There are two commonly used techniques to perform the division operation: the Sweeny-Robertson-Tocher (SRT) technique, and the Newton-Raphson technique. Newton-Raphson operations have the attractive property of a quadratic convergent operation, meaning that the quotient result doubles precision after each iteration. The SRT algorithm is a non-restoring method which iteratively subtracts divisor multiples from a working partial remainder to determine the quotient, with a fixed number of quotients digits determined in each iteration. This specification addresses floating point division using SRT type techniques.

Floating point numbers in computers are generally represented in scientific notation. In more precise mathematical terms, the operands of a binary floating-point division are a dividend, represented by $(-1)^{Sa} \times F_a \times 2^{Ea-Ebias}$, a divisor given by $(-1)^{Sb} \times F_b \times 2^{Eb-Ebias}$, which produces a quotient given by $(-1)^{Sr} \times F_r \times 2^{Er-Ebias}$, where S is the sign bit, F is the mantissa (for $1 \leq F < 2$), and E is the biased exponent assuming an Institute of Electrical and Electronic Engineers (IEEE) 754 standard normalized numbers. In order to accommodate both positive and negative exponentials without requiring a sign bit for the exponential, each of the exponential numbers is biased based on the precision of the variable. For single precision numbers, the IEEE 754 standard requires an $E_{bias}=127$, for double precision numbers, an $E_{bias}=1,023$.

In broad terms, performing a floating-point division operation comprises the following steps:

TABLE 1

| Step | Operation |
|---|---|
| 1 | $E_r = E_a - E_b + E_{bias}$ (find the power of the quotient) |
| 2 | $S_r = S_a \oplus S_b$ (exclusive-OR the sign bits of each mantissa to determine the sign of the division operation) |
| 3 | $F_r = F_a \div F_b$ (In SRT, performed by iterative subtraction of multiples of Fb from a working partial remainder which is then shifted up. The working partial remainder initialized with $F_a$.) |
| 4 | Rounding of the fractional result to the most significant digit. |
| 5 | Normalize $F_r$ (that is, $1 \leq F_r < 2$) |

TABLE 1-continued

| Step | Operation |
|---|---|
| 6 | Detect underflow (if $E_r$ is less than one) or overflow (if $E_r$ is less than 1,023 (for double precision) or 127 (for single precision)) |

While all these steps are required for each floating-point division operation, it is step three that is the primary concern of this specification.

The SRT type algorithms iteratively subtract divisor multiples from a partial remainder to determine the quotient with a fixed number of quotient bits determined in each iteration or cell, according to the following equations:

$$P_{i+1} = R(P_i - Q_{i+1}D) \quad (1)$$

$$P_i^* = \text{trunc}(P_i) \quad (2)$$

where $P_{i+1}$ is the calculated partial remainder within the cell (in carry-save form), $P_i$ is the partial remainder from the previous iteration (with the initial partial remainder set equal to the dividend), R is the radix of a quotient digit, $Q_{i+1}$ is the quotient digit at iteration i+1, D is the divisor, and $P_i^*$ is an estimated partial remainder where $P_i^* \leq P_i$.

In the SRT type algorithms, the precision of the quotient is dependent upon the number of iterations performed (the number of subtraction division cells the calculation propagates through) and the radix of the calculation. In a Radix-4 calculation, two quotient bits are calculated with each cell or stage. With Radix-8, three quotient bits are calculated with each cell, and so on. The more cells that can complete within a given time, the more exact the quotient can be calculated, or the less time it requires to take the calculation to full precision. Thus, speed of the cells is of paramount importance.

Related art SRT type algorithms implement time saving features in an attempt to speed the calculation time through each cell. For example, the partial remainders Pi are in carry-save form and thus may use more efficient carry-save adders to perform the subtraction required of equation (1) (as opposed to fall carry-propagation adders). Further, the multiplication by the radix R (where the radix is a multiple of two—2, 4, 8, 16, etc.) is a simple shift operation in binary systems. Moreover, multiplication of the quotient digit Q times the divisor D is either a simple shift operation (for powers of two), and/or is calculated simultaneously with prescaling of the dividend and a divisor prior to the parameters entering the cells.

A major limitation of related art SRT type cells however is determining the quotient digit (in a Radix-4 system, each quotient digit reveals two quotient bits) from the calculated partial remainder. Understanding this limitation of related art SRT type cells however requires a better understanding of the cells themselves. In defining the parameters of a subtractive division cell, it was mentioned that the partial remainder $P_i$ is in carry-save form. Subtraction of the quotient multiples (the $Q_{i+1}$ D portion of equation (1)) from the partial remainder $P_i$ therefore takes place with carry-save adders, which are faster than carry-propagate adders. Consider for purposes of explanation the addition of two binary numbers:

TABLE 2

| | |
|---|---|
| AUGEND | 1010101 |
| ADDEND | 0001101 |
| Carry Propagate Add Result | 1100010 |
| Carry-Save Add Sum | 1011000 |
| Carry-Save Add Carry | 0000101 |
| Verification Add of Carry-Save Result | 1100010 |

The full carry-propagate add produces the result 1100010. However, calculating this result requires the carry from each bit addition to propagate to the next stage before the final result is achieved. If each adder requires two gate delays to complete, the time it takes to complete the full carry-propagate add of the exemplary set of numbers in Table 2 is at least 14 gate delays. The carry-save result, however, in not combining the carries from each bit addition and thus leaving the result in the redundant carry-save form, may be completed in only two gate delays, regardless of the number of bits. Considering that the mantisa of each floating point number may be 50 bits long or more, it is easily seen why the related art SRT cells use this addition method and number form. A verification that the carry-save form is equal to the results of the carry-propagate addition is included in Table 2, which is simply the full carry-propagate add of the sum and carry results. Thus, in SRT cells, partial remainders are calculated using carry-save adders, leaving the resultant in the carry-save form.

A quotient digit determined by each subtractive division cell is selected based on the value of the partial remainder calculated by that cell. The most accurate selection of the quotient digit would be based on the complete partial remainder calculated by the cell, but calculating the complete partial remainder requires a full carry-propagate add of the carry-save resultant, thus negating its benefits. Rather than perform the full carry-propagate add, SRT type cells rely upon an estimated partial remainder $P_i^*$ as indicated in equation (2). In this way, only a portion of the partial remainder calculated by the SRT type cell needs to be converted from carry-save form.

To obtain the estimated partial remainder, related art SRT type cells perform a full carry-propagate add of the most significant bits of the calculated partial remainder. U.S. Pat. No. 5,954,789 to Yu et al. (hereinafter the '789 patent) describes in the Background section that conventional wisdom prescribes at least four bits of the calculated partial remainder should be used to determine the next quotient digit for Radix-2 SRT type systems. Similarly, related art Radix-4 implementations need six bits of the partial remainder $P_i$ to determine the next quotient digit. The related art devices apply the estimated partial remainder to a look-up table, or a hard-coded set of logic, to predict the quotient digit. The '789 patent exemplifies just such a look-up table at Table I (spanning columns 4 and 5) for the Radix-2 implementation therein. Thus, related art SRT type cells perform the carry-save add to obtain the partial remainder in carry-save form, perform a full carry-propagate add of the most significant six bits of the partial remainder (for a Radix-4 system) to obtain the estimated partial remainder, and finally apply the estimated partial remainder to a look-up table or hard-coded decision tree to obtain the next quotient digit. Since divisor multiples are calculated in advance, and the subtraction of the divisor multiples from the partial remainder can be accomplished in approximately two gate delays, the limitation of the speed of SRT type cells is calculating the estimated partial remainder (six bit full carry-propagate add for Radix-4 implementations) and applying the estimated partial remainder to the look-up table to determine the next quotient digit.

What is needed in the art is a way to increase the speed of determining the quotient digits of an SRT type floating-point division cell.

BRIEF SUMMARY OF THE PREFERRED EMBODIMENTS

The problems noted above are solved in large part by the structure of and a method of operating an subtractive division (SD) cell where a portion of the partial remainder or estimated partial remainder directly indicates the next quotient digit. More particularly, by sufficiently constraining the prescaled range for each possible divisor, only a few bits of the partial remainder (the exact number dependent upon the radix), along with their related carries (if any), directly indicate the value of the next quotient digit. Because fewer bits of the partial remainder are needed to make this determination than needed in related art devices, and further because no look-up table or hard-coded decision tree is required, calculation time within each SD cell is shorter than related art devices. Having a shorter calculation time within each SD cell allows for either completion of a greater number of SD cells within each clock cycle, or completion of the calculation to full precision in less time.

More particularly, the preferred SD cell operation and implementation constrains the prescaled divisor D based on the Radix R of the floating point division system according to substantially the relation $1 \leq D < (1+(1/R))$. With the divisor scaled to this range, and likewise with the dividend scaled by an equal amount, the whole number portion of the estimated partial remainder produced by each SD stage or cell, or its complement, directly indicates the quotient digit in most cases. Because only a limited number of bits need to be converted from carry-save form to determine the quotient digit in most instances, less time is required to perform the carry-propagate add.

In the preferred Radix-4 implementation, quotient digits determined by each SRT cell come from the set $\{-3, -2, -1, -0, 0, 1, 2, 3, 4\}$, and the prescaled divisor is within the range $1 \leq D < 1.25$. In this Radix-4 system, each quotient digit determined increases the quotient precision by two bits. Consider an exemplary SD cell in the Radix-4 system that calculates an estimated partial remainder of 000.1101 binary. Because of the constraint placed on the range of the prescaled divisor, this estimated partial remainder directly indicates 11 binary or 3 decimal (after multiplication by the radix) as a next quotient digit. The quotient digit is thus directly indicated by the estimated partial remainder.

The preferred hardware implementation uses more hardware than a minimum requirement to implement the SD cell, but in so doing, significantly decreases the time for each SD cell to complete. In particular, each SD cell of the preferred hardware implementation begins the process of calculating the estimated partial remainder before the divisor multiples are subtracted to obtain the carry-save form partial remainder. The process of determining the next quotient digit preferably completes substantially simultaneously with the results of the subtraction of the divisor multiples to obtain the carry-save form partial remainder. Thus, while related art Radix-4 SRT type cells require approximately six gate delays for completion, (approximately four gate delays to determine the partial remainder and estimated partial remainder, and at least two gate delays applying the estimated partial remainder to the look-up table or hard-coded decision tree to determine the next quotient digit), the SD cell of the preferred embodiment operates in approximately four gate delays.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ".

Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
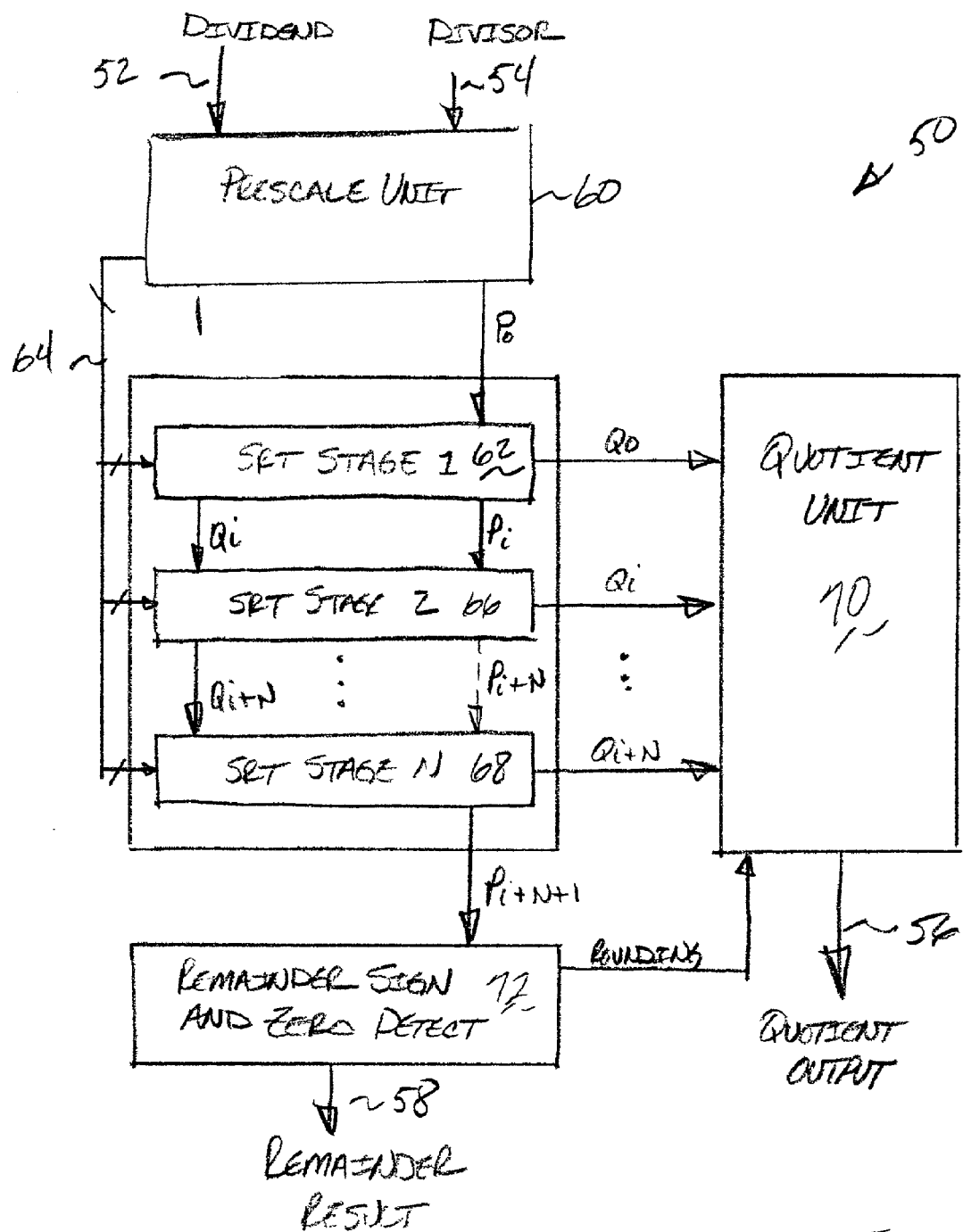
FIG. 1 shows a floating point division system of the preferred embodiment.

FIG. 1 shows a floating-point division system 50 of a central processing unit or microprocessor of the preferred embodiment. In particular, the floating-point system is supplied a dividend 52 and a divisor 54. As is the case for a division, the dividend is divided by the divisor to obtain a quotient 56. Since it is possible that division does not produce exact results, a remainder 58 is also preferably produced which indicates whether the division was exact.

Before the division in the floating-point division system 50 begins, both the dividend and the divisor are preferably prescaled in the prescaling unit 60. The floating-point division system 50 preferably operates in a microprocessor that represents floating-point numbers according to the Institute of Electronic and Electrical Engineers (IEEE) 754 standard. This standard is, in effect, a method of representing numbers in scientific notation within a computer. The Background section discusses this notation generally, and it is noted that the mantisa F of each number in this format may take on values from $1 \leq F < 2$. In the division of numbers in scientific notation, calculating the resultant exponent is done external to the division unit, inasmuch as this determination is a subtraction or addition operation. However, the mantisa of both the dividend and the divisor are preferably divided using the floating-point division system 50.

In the preferred embodiments, the mantisa of the divisor is scaled to be within the range given by the following equation.

$$1.0 \leq D < 1 + \frac{1.0}{R} \quad (3)$$

where D is the mantisa of the divisor and R is the radix of the floating-point division system 50. Table 3 below shows the possible prescaling factors for each mantissa in the range of possible mantissa values in a Radix-4 system:

TABLE 3

| Divisor | Prescaling Factor | Actual Scaling |
|---|---|---|
| $1 \leq D < 1.25$ | 1 | 1 |
| $1.25 \leq D < 1.5$ | 5/6 | $1\text{-}1/4 + 1/16 \cong 5/6$ |
| $1.5 \leq D \leq 1.75$ | 5/7 | $1\text{-}1/4 - 1/16 \cong 5/7$ |
| $1.75 \leq D < 2.0$ | 5/8 | $1\text{-}1/4 + 1/8 = 5/8$ |

As the mantissa of the divisor D ranges from 1.0 to 2.0, the prescaling factor likewise transitions from 1 to 5/8 respectively. Consider, for example, the mantisa of a divisor D having a value between 1.75 and 2.0. In such a case, the divisor needs to be scaled, or multiplied, by 5/8 to bring it within the range of equation (3) above. Because prescaled values of the divisor D may be within a range of values, the scaling can be approximated using fractional numbers based on powers of two so that mere shifting and addition may be used to calculate the prescaled divisor. Not only is the divisor be prescaled, but the dividend mantissa as well is preferably prescaled by the same amount as the divisor. Mathematically, performing equal prescaling on both the dividend and the divisor leaves an equivalent fraction.

Referring again to FIG. 1, the prescaled dividend becomes the $P_0$, and is the partial remainder input to the first subtractive division (SD) cell or stage 62. Each SD stage subtracts a divisor multiple, the quotient digit multiplied by the divisor D, from the partial remainder of the previous stage to obtain the next partial remainder. Thus, the subtraction involves a multiple of the divisor D. Preferably, the prescaling unit 60 calculates in advance each quotient divisor multiple, and couples the quotient divisor multiples to each SD stage. More particularly, the quotient multiples couple from the prescaling unit 60 along lines 64 to each SD stage 62, 66 and 68.

The number of quotient divisor multiples is dependent upon the radix of the floating-point division system. In general terms, the quotient digits fall within the set:

$$Q \in \{-(R-1), -(R-2), \ldots, -(R-N), -0, 0(R-N), \ldots, (R-2), (R-1), R\}$$

where Q is the set of possible quotient digits, R is the radix of the floating-point division system, and $N=R-1$. Thus, the prescale unit 60 preferably computes, in the general form, $(R-1)D$ (positive and negative), $(R-2)D$ (positive and negative) through RD. Consider the preferred Radix-4 implementation where the quotient digit set is:

$$Q \in \{-3,-2,-1,-0,0,1,2,3,4\}$$

In this case, the prescaling unit preferably calculates 3D (both positive and negative), 2D (both positive and negative), and 4D. The zero multiple is straight-forward, and the negative zero multiple is merely the two's complement version of the zero multiple. Moreover, the single multiple of D is a pass-through operation. Both the 2D and 4D multiples are shift operations, and thus, in the radix-4 system, only the 3D multiple requires an actual multiplication. Thus, quotient digits fall within the set, and the prescale unit 60 preferably calculates a divisor multiple based upon each quotient digit in the set prior to the first SD cell performing its operation.

Referring again to FIG. 1 to complete a general overview of operation of the floating-point division system, each SD stage or cell 62, 66 and 68 subtracts a divisor multiple from the partial remainder provided from the previous stage (except for the first stage 62 which subtracts its divisor multiple from the prescaled dividend) to create the next partial remainder. After each subtraction step, the SD stage estimates a quotient digit for the next stage, and the process continues. The quotient digits selected by each SD stage preferably couple to the subsequent stage and the quotient unit 70, which converts the quotient digits into quotient bits with the full result being the quotient output 56. It must be understood that the quotient digits selected by each SD stage 70 could be, and preferably are, in a different radix than the standard binary numbers used in computers. Thus, the quotient unit 70 converts the number represented by the quotient digits in the particular radix base, preferably Radix-4, to quotient digits in binary form. Finally, the remainder sign and zero detect logic 72 has as its input the partial remainder propagated from the final SD stage 68, and from that final partial remainder, the logic 72 calculates whether the division was exact or inexact.

The preferred embodiments of the present invention are Radix-4 floating point division systems, and the following discussion of the hardware implementation is based on a Radix-4 system; however, one of ordinary skill in the art, once fully appreciating the discussion with respect to the Radix-4 system, could devise equivalent systems in different radix bases, and these systems in different radix bases would be within the contemplation of this invention.

Figure 2:
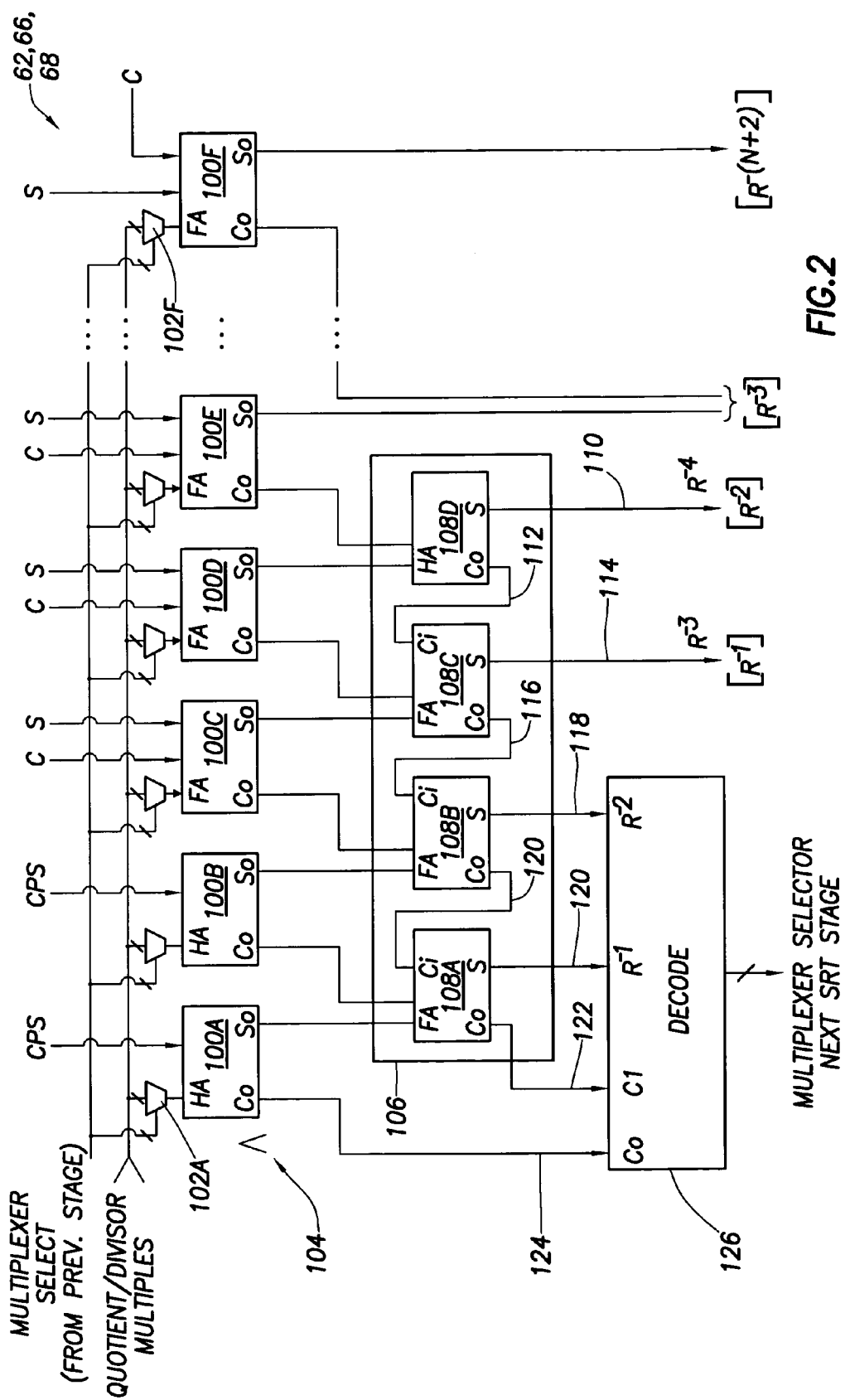
FIG. 2 shows an implementation of a subtractive division (SD) cell of an embodiment of the present invention.

FIG. 2 shows an embodiment of an SD stage 62, 66, 68. In particular, FIG. 2 shows a series of carry-save adders 100A through F, which as a group may be referred to as an adder logic. Only six adders 100 are shown in FIG. 2, but in a floating-point implementation, 55 such adders are required to perform the addition of the divisor multiples and the partial remainders from the previous stage. If the SD stage at issue is the first SD stage 62, then the estimated partial remainder is the scaled dividend.

In order to speed the computation time through each SD stage or cell, quotient divisor multiples are preferably pre-calculated in the prescaling unit 60 and are made available to each SD stage prior to or at least contemporaneous with that SD stage performing its calculation. Referring again to FIG. 2, the adders 100 are coupled to the multiplexers 102. Each multiplexer 102 has as its inputs respective bits of each of the quotient divisor multiples. Based on the value of the select lines for each of the multiplexers 102, one input couples through the multiplexer and thus to the adders 100. A quotient digit selected by the previous SD stage drives the select lines of the multiplexers 102, thus coupling the appropriate quotient divisor multiple to the adders 100. In the case of a first SD stage 62, the first quotient digit is determined by the scaled dividend. Thus, each of the adders 100 has as one input respective bits of the selected divisor multiple, and has as a second input respective bits of the partial remainder from the previous stage (some of the bits of which may be represented in carry-save form, which is discussed more fully below). The adders 100 perform the addition to obtain a resultant in carry-save form. One of ordinary skill in the art understands that the subtraction required to determine the next partial remainder may be accomplished with the adders 100 by adding the two's complement version of the divisor multiples.

FIG. 2 shows, just to the left of the adders 100, a caret 104. This caret 104 symbolically indicates the radix point in the resultant (which is effectively the partial remainder prior to multiplication by the radix (shifting)). As implied by FIG. 2 then, the adders 100 calculate bit values of the resultant to the right of the radix point. Because the prescaled version of the divisor is within the boundary set by equation (3) above, in the preferred embodiment the two most significant bits of the resultant to the right of the radix point 104 indicate the quotient digit for the next SRT stage in most cases. Because determining the next quotient digit is based on the two most significant bits of the resultant to the right of the radix point, and not the most significant bits generally (those bits to the left of the radix point), the preferred embodiments of the present invention do not calculate the resultant bits to the left of the radix point.

Because the next SD stage simply adds a divisor multiple to the carry-save form of the partial remainder (shifted resultant), the full non-redundant value of the partial remainder calculated by each stage need not be determined. However, determining a quotient digit by a SRT stage is based on the partial remainder calculated by the SD stage, and thus at least some of the bits of the partial remainder need to be assimilated (converted from carry-save form into carry-propagate form). Assimilating only a few of the pertinent bits of the partial remainder thus creates the estimated partial remainder $P_i^*$. In order to calculate the estimated partial remainder, logic 106 converts the carry-save form of the four most significant bits to the right of the radix point of the resultant into carry-propagate form. The third and fourth bits to the right of the radix point are not needed for the quotient digit determination, but are calculated so that their carry may be considered in order to reduce the error in the estimated partial remainder.

In particular, logic 106 has a series of adders 108A–D. The half-adder 108D calculates the sum of the carry of adder 100E and the sum of adder 100D to obtain a sum $R^{-4}$ 110 (that is, the resultant bit four places to the right of the radix point) and a carry 112 that feeds the full adder 108C. Carry 112, along with the sum from adder 100C and the carry from adder 100D combine to produce the sum $R^{-3}$ 114 (the resultant bit three places to the right of the radix point) and the carry 116. Likewise, adder 108C produces a sum $R^{-2}$ 118 and a carry 120, and full adder 108A produces its sum $R^{-1}$ 120 and carry-out 122. Thus, logic 106 produces carry-propagate forms of the four most significant bits of the resultant to the right of the radix point, namely $R^{-1}$ (120)$R^{-2}$ (118)$R^{-3}$ (114) and $R^{-4}$ (110).

The two most significant bits to the right of the radix point 104 of the resultant, along with their carry, indicate the quotient digit for the next SD stage. That is, the combination of $R^{-2}$ and $R^{-2}$, or their complement, indicate the value of the next quotient digit directly with $C_0$ 124 and $C_1$ 122 determining the sign. In the special case where both $C_0$ 124 and $C_1$ 122 are not asserted, these digits become the controlling factors in the quotient digit selection. Table 4 below defines a truth table for possible values of $C_0$, $C_1$, $R^{-1}$, $R^{-2}$ and the next quotient digit $Q_{i+1}$ for a radix for a Radix-4 implementation.

TABLE 4

| $C_0$ | $C_1$ | $R^{-1}$ | $R^{-2}$ | $C_0$ AND $C_1$ | $C_0$ XOR $C_1$ | $Q_{i+1}$ decimal |
|---|---|---|---|---|---|---|
| 0 | 0 | 0 | 0 | 0 | 0 | −3 |
| 0 | 0 | 0 | 1 | 0 | 0 | −2 |
| 0 | 0 | 1 | 0 | 0 | 0 | −1 |
| 0 | 0 | 1 | 1 | 0 | 0 | −0 |
| 0 | 1 | 0 | 0 | 0 | 1 | 0 |
| 0 | 1 | 0 | 1 | 0 | 1 | 1 |
| 0 | 1 | 1 | 0 | 0 | 1 | 2 |
| 0 | 1 | 1 | 1 | 0 | 1 | 3 |
| 1 | 0 | 0 | 0 | 0 | 1 | 0 |
| 1 | 0 | 0 | 1 | 0 | 1 | 1 |
| 1 | 0 | 1 | 0 | 0 | 1 | 2 |
| 1 | 0 | 1 | 1 | 0 | 1 | 3 |
| 1 | 1 | 0 | 0 | 1 | 0 | 4 |
| 1 | 1 | 0 | 1 | 1 | 0 | d/c |
| 1 | 1 | 1 | 0 | 1 | 0 | d/c |
| 1 | 1 | 1 | 1 | 1 | 0 | d/c |

As shown in Table 4, if ($C_0$ AND $C_1$) is not asserted, and ($C_0$ XOR $C_1$) is asserted, the next quotient digit is the value of the combination of $R^{-1}$ and $R^{-2}$ (shown in the table in the $Q_{i+1}$ table in decimal form). If ($C_0$ AND $C_1$) is not asserted, and ($C_0$ XOR $C_1$) is not asserted, the next quotient digit is the negative value of the one's complement of $R^{-1}$ and $R^{-2}$. Finally, when ($C_0$ AND $C_1$) is asserted, the next quotient digit is the value of the radix, in the Radix-4 the next quotient digit is four. The final three entries in Table 4 are "don't care" (d/c) conditions as the $R^{-1}$ and $R^{-2}$ are zero in the preferred embodiments when ($C_0$ AND $C_1$) is asserted. Thus, the decode logic 126 takes into account the value of $C_0$ 124, $C_1$ 122, $R^{-1}$ 120 and $R^{-2}$ 118 to produce a multiplexer select output for the next SRT stage. As indicated by FIG. 2, preferably the multiplexer select for the next SD stage has a plurality of signals coupled to the select lines of each multiplexer in the next stage, and indeed it is preferred that these select lines are fully decoded.

The carry-save form partial remainder from the previous SD stage becomes the input of the next SD stage. The multiplication of the resultant required by equation (1) (multiplication by the radix base R) is preferably accomplished by a hardwired shift between SD stages. FIG. 2 shows, in brackets near the bottom of the Figure, what each signal becomes in the next SD stage. Because the $R^{-3}$ and $R^{-4}$ partial remainders from the previous stage are in carry-propagate form, the adders for these bits in the next stage need only be half adders, which is also reflected by half adders 100A and 100B in the adder section 100. The remaining adders, 100C through 100F in the drawing (again understanding that there will be 55 such adders in an actual implementation) are all full adders to accommodate the carry-save form of most of the bits of the previous SD stage and the carry propagate form of the division multiples.

The implementation shown in FIG. 2 is considered a direct implementation of the preferred SD algorithm. The implementation shown in FIG. 2 requires the least amount of hardware, but is not the fastest way to implement an SD cell. In particular, the time it takes to process through the SD cell shown in FIG. 2 is at least two gate delays for propagation through the adders 100, followed by at least eight gate delays for the results of the four bit adder 106 to be complete, followed by a gate delay or two decision time with regard to whether the quotient digit output by the decode logic is positive, negative or the special case. Significant time can be saved in each SD cell if some preprocessing of the information is done. However, this is at the penalty of additional hardware within each SD cell.

Figure 3:
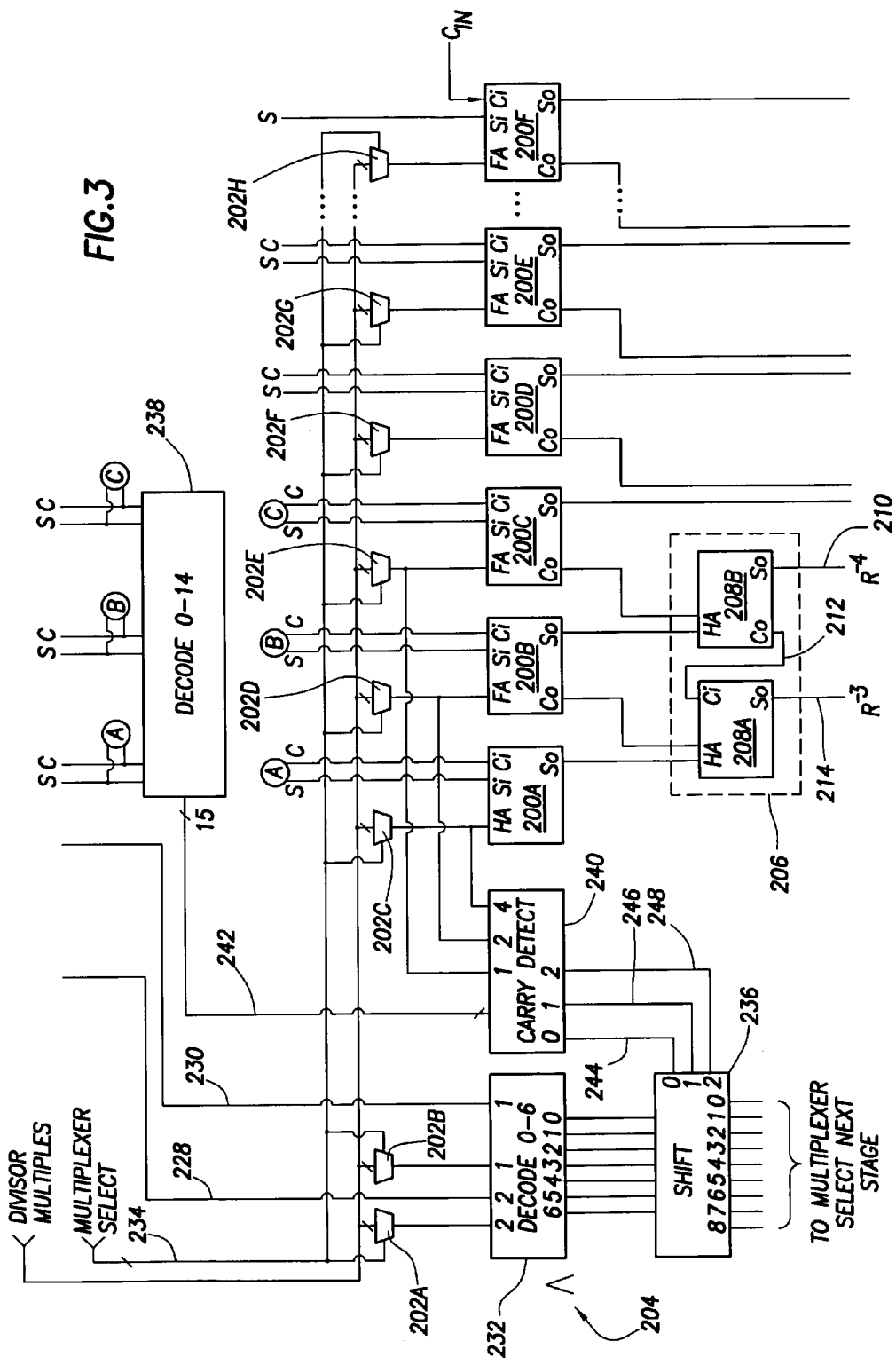
FIG. 3 shows a SD cell of the preferred embodiment of the present invention.

FIG. 3 shows the preferred SD cell hardware implementation. While the SD cell of FIG. 3 requires more hardware (more space on the microprocessor die), the time savings through each SD cell may be significant. Because the preferred implementation, and that shown in FIG. 3, is a Radix-4 system, the partial remainder from a previous SD stage is multiplied by 4 (or shifted left two). Lines 228 and 230 exemplify the shifting (multiplication) of the partial remainder from the previous SD cell, and lines 228 and 230 couple to a decode logic 232. Also coupled to the decode logic 232 are the outputs of multiplexers 202A and 202B. Similar to the implementation shown in FIG. 2, the inputs of the multiplexers 202 are respective bits of the divisor multiples. Multiplexer select lines 234 determine which divisor multiples couple through the multiplexers 202. Thus, decode logic 232 has as its inputs the most significant bits to the right of the radix point 204 of the partial remainder supplied by the previous SD cell and their corresponding divisor multiple bits. The decode logic 232, in broad terms, adds the two partial remainder bit inputs with the corresponding bits supplied by the multiplexers 202A and 202B. In the preferred embodiments, this add is implemented in the form of a 0–6 decoder. Thus, what is input are four bits, each having weighted values (as indicated by the numbers 1 and 2 just below each input in the decode box 232), and what is output is a fully decoded signal representing the sum of those bits. Stated otherwise, the largest result that the addition of two 2-bit numbers could be is 111 binary (with a carry in) or 7 decimal. Thus, the decode logic 232 has seven output lines (labeled 0–6), only one of which will be asserted based on the proper outcome. This encoding scheme is also known as "one-hot" encoding. The adding and output of the one-hot encoded number in this fashion is at least as fast as the adders 200A–F, but requires more space on the microprocessor die to implement. However, having the output fully decoded increases the decision process of shift logic 236.

The decode logic 232, in effect, adds two 2-bit numbers as part of the estimated partial remainder determination; however, the effective add within decoder logic 232 does not take into account any carries that may come from the lower order bits of the resultant. The decode logic 238 and carry-detect logic 240 provide the necessary information regarding carries into the two most significant bits of the partial remainder. Each of these will be discussed in turn.

In broad terms, the decode logic 238 performs addition of two incoming three bit numbers, and produces an output in one-hot encoded form. Again, implementing addition as a decode 0–14 logic 238 takes more hardware than full adder counterparts, but the fully decoded output 242 forms the basis for shift operations within carry-detect logic 240 (to be discussed more fully below). Preferably, decode logic 238 begins the process of calculating the estimated partial remainders for the particular SD cell in advance. Indeed, in the preferred embodiment, decode logic 238 operates substantially simultaneously with the equivalent of adder logic 206 of the previous SD cell. Thus, preferably the fully decoded outputs 242 of decode logic 238 are available before the adders 200 have had an opportunity to perform their add operation.

Carry-detect logic 240 has as its inputs the fifteen wire output 242 from the decode logic 238 and the outputs of the multiplexers 202C, 202D and 202E (three bits of the divisor multiple). In broad terms, the carry-detect logic 240 adds the output of the decode logic 238 to the three bits of the divisor multiple. As one of ordinary skill in the art is aware, addition of binary numbers to one-hot encoded numbers is a shift operation, the decision to shift depending upon whether various bits of the binary number are asserted. In particular, if any one bit of the binary number (in this case three bits of the divisor multiples) is asserted, then the one-hot encoded number is shifted left based on the place value of the bit (e.g., adding 001 binary results in a one bit shift, adding a 010 results in a two bit shift, adding a 101 results in a five bit shift).

The outputs of the carry-detect logic 240 are not one-hot encoded, but instead preferably indicate whether the output of the decode logic 232 should be shifted left zero bits, shifted left one bit, or shifted left two bits. Thus, the carry-detect logic 240, in addition to performing the addition of the one-hot encoded result 242 with their counterparts of the divisor multiples, also preferably examines the result to ascertain an output. In particular, the carry-detect logic 240 preferably asserts the zero shift 244 line if the one-hot encoded result of the addition of the signals 242 with the most significant bits of the divisor multiples is between zero and seven. The carry-detect logic 240 preferably asserts the shift one signal 246 if the one-hot encoded result of the signals 242 and the most significant bits of the divisor multiple is between eight and fifteen. Finally, the carry-detect logic 240 preferably asserts the shift two signal 248 if the one-hot encoded result of the signals 242 and the most significant bits of the divisor multiple is between sixteen and twenty one.

The signals 244, 246 and 248 couple to the shift logic 236, which shifts its inputs (0 to 6 from decode logic 232) based on which of the three signals from the carry-detect logic 240 are asserted. The output of the shift logic 236 couples to the inputs of the multiplexers of the next SRT cell, and also indicate the next quotient digit.

Operation of the remainder of the implementation shown in FIG. 3 is substantially the same as that described with respect to FIG. 2. In particular, the adders 200 add the partial remainder from the previous SD stage or cell to the two's complement version of the divisor multiples to obtain, in carry-save form, the resultant for the present SD cell. The $R^{-3}$ and $R^{-4}$ carry-save representations are preferably converted in logic 206 to their carry-propagate form so as to feed the decode 0–6 logic of the next SD stage.

From a black box standpoint, the inputs and outputs of the implementations shown in FIGS. 2 and 3 are the same. However, the internal implementation of the preferred embodiment shown in FIG. 3 is faster than the direct implementation shown in FIG. 2. The speed increases are implemented first by duplicating portions of calculating the partial remainder. In particular, the decode 0–14 logic 238 preferably begins the process of calculating digits of the estimated partial remainder substantially simultaneously with operation of adder logic (206) from the previous stage. Thus, output signals 242 from the decode 0–14 logic 238 are preferably available at least as early as when the adders 200 of the present SD stage begin their work. While the adders 200 are calculating the resultant, the carry-detect logic 240 preferably determines how much shift will be necessary in the shift logic 236. The shift output signals 244, 246 and 248 are preferably determined roughly simultaneously with the results of the adders 200. Thus, while the add logic 206 performs the final step of converting from carry-save to carry-propagate form of the $R^{-3}$ and $R^{-4}$ bits of the partial remainder, the shift logic 236 performs the final shift operation (if required) of the determination of the next quotient digit (which is also the multiplexer select signals for the next SD stage). The multiplexer selects for the next SD stage are preferably available substantially simultaneously with the results of the add logic 206. Considering that the carry-save add completed by adders 200 and the carry-save to carry-propagate translation of two of those bits done by add logic 206 takes approximately two gate delays each, it is seen that this preferred hardware implementation of an SD cell can complete in approximately four gate delays. This translates roughly into the ability to complete three SD cells within one complete cycle of the clock of 1.5 GHz microprocessor.

While the preferred embodiments of the present invention are implemented in a Radix-4 system, by appropriately constraining the prescaling range for the divisor, having the most significant bits to the right of the radix point of the resultant directly represents the next quotient digit may be implemented in any system (for example, Radix-2, Radix-4, Radix-8, Radix-16, Radix-32, etc.). As the radix of the calculation increases, so too does the number of bits needed to indicate the next quotient digit and the hardware to implement each SD stage. While the adder stage takes approximately two gate delays regardless of the radix (adders 100 of FIG. 2, or adders 200 of FIG. 3), the number of bits of the resultant that needs to be converted from carry-save to carry-propagate form increases with radix. Additional full adders in the SRT cell thus add significant time to the completion process.

The above discussion is meant to be illustrative of the principles and various embodiments of the present invention. Numerous variations and modifications will become apparent to those skilled in the art once the above disclosure is fully appreciated. For example, FIG. 1 shows multiple SD stages used to calculate the quotient; however, an SD system could be implemented with only a single cell having the outputs fed back to the inputs through latches. One of ordinary skill in the art, now understanding the embodiments described, could design other equivalent hardware implementations to those described. It is intended that the following claims be interpreted to embrace all such variations and modifications.

What is claimed is:

1. In a microprocessor implementing a subtraction division algorithm for determining a quotient of a floating point divide operation by iteratively subtracting divisor multiples from a partial remainder, each subtraction producing an unshifted partial remainder in carry-save form that is multiplied by the radix of the algorithm to obtain a next partial remainder, a method of determining quotient digits comprising:

calculating a carry-propagate form of a plurality of most significant bits to the right of the radix point of the unshifted partial remainder, a number of bits selected from the following table based on a radix of the SRT algorithm:

| Radix | Number of bits to convert to carry-propagate form |
|---|---|
| 2 | 3 |
| 4 | 4 |
| 8 | 5 |
| 16 | 6 |
| 32 | 7 | and assigning a next quotient digit to be a whole number value of at least one of the most significant bits to the right of the radix point of the unshifted partial remainder.

2. A method of determining quotient digits comprising:
calculating a carry-propagate form of a plurality of most significant bits to the right of the radix point of the unshifted partial remainder; and
assigning a next quotient digit to be a whole number value of at least one of the most significant bits to the right of the radix point of the unshifted partial remainder
wherein assigning a next quotient digit to be a whole number value of at least one of the most significant bits to the right of the radix point of the unshifted partial remainder further comprises assigning a next quotient digit to be the whole number value of one of a number of most significant bits selected from the following table based on the radix of the divider algorithm:

| Radix | Number of bits representing the next quotient digit |
|---|---|
| 2 | 1 |
| 4 | 2 |
| 8 | 3 |
| 16 | 4 |
| 32 | 5. |

3. In a microprocessor implementing a subtraction division algorithm for determining a quotient of a floating point divide operation by iteratively subtracting divisor multiples from a partial remainder, each subtraction producing an unshifted partial remainder in carry-save form that is multiplied by the radix of the algorithm to obtain a next partial remainder, a method of determining quotient digits comprising:
calculating a carry-propagate form of four bits to the right of the radix point of the unshifted partial remainder in a Radix-4 divider algorithm; and
assigning a next quotient digit to be a whole number value of at least one of the most significant bits to the right of the radix point of the unshifted partial remainder.

4. The method of determining quotient digits as defined in claim 3 wherein assigning a next quotient digit to be a whole number value of at least one of the most significant bits to the right of the radix point of the unshifted partial remainder further comprises assigning the next quotient digit to be a whole number value represented by two most significant bits to the right of the radix point of the unshifted partial remainder in a Radix-4 divider algorithm.

5. In a microprocessor implementing a subtraction division algorithm for determining a quotient of a floating point divide operation by iteratively subtracting divisor multiples from a partial remainder, each subtraction producing an unshifted partial remainder in carry-save form that is multiplied by the radix of the algorithm to obtain a next partial remainder, a method of determining quotient digits comprising:
prescaling the divisor to be in the range:

$1 \leq D < 1+(1/R)$ where D is the divisor, and R is the radix of the floating point division logic;
calculating a carry-propagate form of a plurality of most significant bits to the right of the radix point of the unshifted partial remainder; and
assigning a next quotient digit to be a whole number value of at least one of the most significant bits to the right of the radix point of the unshifted partial remainder.

6. In a microprocessor implementing a subtraction division algorithm for determining a quotient of a floating point divide operation by iteratively subtracting divisor multiples from a partial remainder, each subtraction producing and unshifted partial remainder in carry-save form that is multiplied by the radix of the algorithm to obtain a next partial remainder, a method of determining quotient digits comprising:
calculating a carry-propagate form of a plurality of most significant bits to the right of the radix point of the unshifted partial remainder; and
assigning a next quotient digit from the set of possible quotient digits $\{-(R-1), -(R-2), \ldots, -(R-N), -0,0,(R-N), \ldots (R-2), (R-1), R\}$ where R is the radix and N=R−1.

7. The method of operating the iterative cell as defined in claim 6 further comprising assigning a next quotient digit from the set $\{-3,-2,-1,-0,0,1,2,3,4\}$ for a Radix-4 subtractive division algorithm.

8. A microprocessor having a subtractive division (SD) cell comprising:
a first adder logic having a first set of inputs coupled to divisor multiples and a second set of inputs coupled to a partial remainder from a previous SD cell, the first adder logic producing bits to the right of the radix point of a resultant in carry-save form and also producing a first carry-out of the resultant;
a second adder logic coupled to a plurality of the most significant bits of the resultant, the second adder logic converting the plurality of most significant bits of the resultant to carry-propagate form and also producing a second carry-out of the conversion of the plurality of most significant bits of the resultant to carry-propagate form; and
a decode logic coupled to the first carry-out, the second carry-out, and the plurality of most significant bits of the resultant in carry-propagate form, and wherein the decode logic selects the quotient digit to be the whole number value of the plurality of most significant bits to the right of the radix point of the resultant in carry-propagate form.

9. A microprocessor having a floating point unit comprising a subtractive division (SD) system that comprises a prescale unit coupled to a divisor and a dividend, and wherein the prescale unit scales the divisor and the dividend, and also calculates divisor multiples, the microprocessor having an SD cell comprising:
a first adder logic having a first set of inputs coupled to the divisor multiples and a second set of inputs coupled to a partial remainder from a previous SD cell, the first adder logic producing bits to the right of the radix point of a resultant in carry-save form and also producing a first carry-out of the resultant;
a second adder logic coupled to a plurality of the most significant bits of the resultant, the second adder logic converting the plurality of most significant bits of the resultant to carry-propagate form and also producing a second carry-out of the conversion of the plurality of most significant bits of the resultant to carry-propagate form; and
a decode logic coupled to the first carry-out, the second carry-out, and the plurality of most significant bits of the resultant in carry-propagate form, and wherein the decode logic selects the quotient digit to be the whole number value of the plurality of most significant bits of the resultant in carry-propagate form when only one of the first and second carry-outs is asserted.

10. The microprocessor having an SD cell as defined in claim 9 wherein said decode logic selects the quotient digit to be a negative one's complement of the plurality of most significant bits of the resultant in carry-save form when neither of the first and second carry-outs is asserted.

11. The microprocessor having an SD cell as defined in claim 10 wherein said decode logic selects the quotient digit to be the value of the radix of the SRT division system when the both the first and second carry-outs are asserted.

12. The microprocessor having an SD cell as defined in claim 11 wherein said second adder logic converts four of the most significant bits of the resultant to carry-propagate form in a Radix-4 SRT division system.

13. The microprocessor having an SD cell as defined in claim 12 wherein said the decode logic selects the quotient digit to be the whole number value of two of the most significant bits of the resultant in carry-propagate form in a Radix-4 system when only one of the first and second carry-outs is asserted.

14. A microprocessor having a floating point unit comprising a subtractive division (SD) system that comprises a prescale unit coupled to a divisor and a dividend, and wherein the prescale unit scales the divisor and the dividend, and also calculates divisor multiples, the microprocessor having an SD cell comprising:
   a first adder logic having a first set of inputs coupled to the divisor multiples and a second set of inputs coupled to a partial remainder from a previous SD cell, the first adder logic producing bits to the right of the radix point of a resultant in carry-save form and also producing a first carry-out of the resultant;
   a second adder logic coupled to a plurality of the most significant bits of the resultant, the second adder logic converting the plurality of most significant bits of the resultant to carry-propagate form and also producing a second carry-out of the conversion of the plurality of most significant bits of the resultant to carry-propagate form; and
   a decode logic coupled to the first carry-out, the second carry-out, and the plurality of most significant bits of the resultant in carry-propagate form, and wherein the decode logic selects the quotient digit from the set $\{-(R-1), -(R-2), \ldots, -(R-N), -0,0,(R-N), \ldots, (R-2), (R-1), R\}$ where R is the radix on N=R−1.

15. A microprocessor having a floating point unit comprising a subtractive division (SD) system that comprises a prescale unit coupled to a divisor and a dividend, and wherein the prescale unit scales the divisor and the dividend, and also calculates divisor multiples, the microprocessor having an SD cell comprising:
   a first adder logic having a first set of inputs coupled to the divisor multiples and a second set of inputs coupled to a partial remainder from a previous SD cell, the first adder logic producing bits to the right of the radix point of a resultant in carry-save form and also producing a first carry-out of the resultant;
   a second adder logic coupled to a plurality of the most significant bits of the resultant, the second adder logic converting the plurality of most significant bits of the resultant to carry-propagate form and also producing a second carry-out of the conversion of the plurality of most significant bits of the resultant to carry-propagate form; and
   a decode logic coupled to the first carry-out, the second carry-out, and the plurality of most significant bits of the resultant in carry-propagate form, and wherein the decode logic selects the quotient digit from the set $\{-3,-2,-1,-0,0,1,2,3,4\}$ in a Radix-4 subtractive division system.

16. In a microprocessor, implementing a floating point division algorithm for determining a quotient of a floating point divide operation comprising at least one cell iteratively subtracting divisor multiples from a partial remainder, each subtraction producing a resultant that is multiplied by the radix of the algorithm to obtain a next partial remainder, a method of operating a cell of the a floating point division algorithm comprising
   calculating a carry-save form of a resultant, each digit of the resultant represented by a sum bit and a carry bit, and the calculating the carry-save form of the resultant also producing a first carry-out;
   calculating a carry-propagate form of a plurality most significant bits to the right of the radix point of the resultant, and the calculating the carry-propagate form also producing a second carry-out; and
   assigning a next quotient digit to be a value directly indicated by at least one of the most significant bits to the right of the radix point of the resultant multiplied by the radix if only one of the first and second carry-outs are asserted.

17. In a microprocessor implementing a floating point division algorithm for determining a quotient of a floating point divide operation comprising at least one cell iteratively subtracting divisor multiples from a partial remainder, each subtraction producing a resultant that is multiplied by the radix of the algorithm to obtain a next partial remainder, a method of operating a cell of the floating point division algorithm comprising:
   calculating a carry-save form of the resultant, each digit of the resultant represented by a sum bit and a carry bit, and the calculating the carry-save form of the resultant also producing a first carry-out;
   calculating a carry-propagate form of the most significant bits to the right of the radix point for a Radix-4 divider, and the calculating the carry-propagate form also producing a second carry-out; and
   assigning a next quotient digit to be a value directly indicated by at least one of the most significant bits to the right of the radix point of the resultant multiplied by the radix if only one of the first and second carry-outs are asserted.

18. The method of operating a cell of the floating point division algorithm as defined in claim 17 wherein assigning a next quotient digit to be a value directly indicated by at least one of the most significant bits to the right of the radix point of the resultant multiplied by the radix further comprises assigning the next quotient digit to be a value directly indicated by two of the most significant bits to the right of the radix point multiplied by the radix.

19. In a microprocessor implementing a floating point division algorithm for determining a quotient of a floating point divide operation comprising at least one cell iteratively subtracting divisor multiples from a partial remainder, each subtraction producing a resultant that is multiplied by the radix of the algorithm to obtain a next partial remainder a method of operating a cell of the floating point division algorithm comprising:

calculating a carry-save form of the resultant, each digit of the resultant represented by a sum bit and a carry bit, and the calculating the carry-save form of the resultant also producing a first carry-out;

calculating a carry-propagate form of a plurality most significant bits to the right of the radix point of the resultant, and the calculating the carry-propagate form also producing a second carry-out; and assigning the next quotient digit to be a negative one's complement of at least one of the most significant bits to the right of the radix point of the resultant multiplied by the radix if neither of the first and second carry-outs are asserted.

20. The method of operating a cell of the floating point division algorithm as defined in claim 19 wherein assigning the next quotient digit to be a negative one's complement of at least one of the most significant bits to the right of the radix point of the resultant further comprises assigning the next quotient digit to be the negative one's complement of two of the most significant bits to the right of the radix point of the resultant multiplied by the radix if neither of the first and second carry outs are asserted.

21. The method of operating a cell of the floating point division algorithm as defined in claim 19 further comprising assigning the next quotient digit to be a radix value if both the first and second carry outs are asserted.

22. The method of operating a cell of the floating point division algorithm as defined in claim 21 wherein assigning the next quotient digit to be a radix value if both the first and second carry outs are asserted further comprises assigning a next quotient digit to have a value of four in a Radix-4 divider.

23. In a microprocessor having a floating point division logic, a method of operating an iterative cell of the floating point division logic comprising:

subtracting a divisor multiple from a partial remainder from a previous iterative cell to form a resultant;

multiplying the resultant by a radix of the floating point division logic to obtain a partial remainder for the next iterative cell; and prescaling the divisor such that a whole number part of the partial remainder for the next iterative cell indicates a next quotient digit directly.

24. The method of operating an iterative cell of the floating point division logic as defined in claim 23 wherein prescaling the divisor such that a whole number part the partial remainder for the next iterative cell indicates the next quotient digit directly further comprises prescaling the divisor to be within the range:

$$1 \leq D < 1 + (1/R)$$

where D is the divisor, and R is the radix of the floating point division logic.

25. The method of operating an iterative cell of the floating point division logic as defined in claim 23 wherein subtracting a divisor multiple from a partial remainder from a previous iterative cell to form a resultant further comprises:

adding a two's complement form of the divisor multiple to a carry-save form of the partial remainder from the previous stage to obtain the resultant in carry-save form; and converting a plurality of bits to the right of the radix point of the resultant to carry-propagate form.

26. The method of operating an iterative cell of the floating point division logic as defined in claim 25 wherein converting a plurality of bits to the right of the radix point of the resultant to carry-propagate form further comprises converting to carry-propagate form of a number of bits selected from the following table based on the radix of the floating point division algorithm:

| Radix | Number of bits to convert to carry-propagate form |
|---|---|
| 2 | 3 |
| 4 | 4 |
| 8 | 5 |
| 16 | 6 |
| 32 | 7. |

27. A method of selecting a quotient digit in a cell of a Sweeny-Robertson-Toucher (SRT) division system in a microprocessor, the method comprising:

adding at least one most significant bit in carry-propagate form to the right of the radix of a partial remainder from a previous SRT cell to at least one most significant bit to the right of the radix point of a divisor multiple to obtain a first one-hot encoded output; and increasing a value indicated by the first one-hot encoded output if the addition of lower order bits of the partial remainder from the previous SRT cell and lower order bits of the divisor multiple produces a carry, the increasing producing a second one-hot encoded output, and wherein the second one-hot encoded output directly indicates a quotient digit from a set of possible quotient digits.

28. The method of selecting a quotient digit in a cell of a SRT division system as defined in claim 27 further comprising:

decoding, prior to the adding step, a plurality of lower order bits in carry-save form of the partial remainder from the previous SRT cell to produce a third one-hot encoded output;

summing the third one-hot encoded output with a plurality of lower order bits of the divisor multiple substantially simultaneously with the adding step, the summing producing a shift output; and wherein the increasing step is based on the shift output of the summing step.

29. The method of selecting a quotient digit in a cell of a SRT division system as defined in claim 28 wherein the adding step further comprises adding two most significant bits to the right of the radix of the partial remainder from a previous SRT cell to two most significant bits to the right of the radix point of a divisor multiple to obtain the first one-hot encoded output in a Radix-4 system.

30. The method of selecting a quotient digit in a cell of a SRT division system as defined in claim 29 wherein the decoding step further comprises decoding three lower order bits in carry-save form of the partial remainder from the previous SRT to produce the third one-hot encoded output in a Radix-4 system.

31. The method of selecting a quotient digit in a cell of a SRT division system as defined in claim 30 wherein the summing step further comprises summing the third one-hot encoded output to three lower order bits of the divisor multiple substantially simultaneously with the adding step.

* * * * *

UNITED STATES PATENT AND TRADEMARK OFFICE
CERTIFICATE OF CORRECTION

PATENT NO. : 7,127,483 B2 Page 1 of 1
APPLICATION NO. : 10/036116
DATED : October 24, 2006
INVENTOR(S) : Andrew J. Beaumont-Smith et al.

It is certified that error appears in the above-identified patent and that said Letters Patent is hereby corrected as shown below:

In column 8, line 60, delete "$R^{-2}$" and insert -- $R^{-1}$ --, therefor.

In column 14, line 4, in Claim 6, delete "and" and insert -- an --, therefor.

In column 16, line 18, in Claim 16, delete "a" before "floating".

In column 16, line 19, in Claim 16, delete "comprising" and insert -- comprising: --, therefor.

In column 17, line 1, in Claim 19, delete "remainder" and insert -- remainder, --, therefor.

In column 17, line 48, in Claim 24, after "part" insert -- of --.

Signed and Sealed this

Fourteenth Day of July, 2009

JOHN DOLL
*Acting Director of the United States Patent and Trademark Office*